(12) United States Patent
Yerramalli et al.

(10) Patent No.: US 11,201,706 B2
(45) Date of Patent: Dec. 14, 2021

(54) SOFT ACK-NACK WITH CSI CODEBOOK

(71) Applicant: QUALCOMM Incorporated, San Diego, CA (US)

(72) Inventors: Srinivas Yerramalli, San Diego, CA (US); Xiaoxia Zhang, San Diego, CA (US); Seyed Ali Akbar Fakoorian, San Diego, CA (US); Jing Sun, San Diego, CA (US); Farhad Meshkati, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/653,574

(22) Filed: Oct. 15, 2019

(65) Prior Publication Data

US 2020/0127781 A1 Apr. 23, 2020

Related U.S. Application Data

(60) Provisional application No. 62/749,101, filed on Oct. 22, 2018.

(51) Int. Cl.
*H04L 5/00* (2006.01)
*H04B 7/0456* (2017.01)
*H04W 72/14* (2009.01)
*H04B 7/06* (2006.01)
*H04W 72/04* (2009.01)

(52) U.S. Cl.
CPC ......... *H04L 5/0044* (2013.01); *H04B 7/0482* (2013.01); *H04B 7/0626* (2013.01); *H04L 5/0055* (2013.01); *H04W 72/042* (2013.01); *H04W 72/14* (2013.01)

(58) Field of Classification Search
CPC ..... H04L 5/0044; H04L 5/0055; H04L 72/14; H04B 7/0482; H04B 7/0626; H04W 72/042
USPC .................... 370/329; 455/452.1, 550.1, 418
See application file for complete search history.

(56) References Cited

U.S. PATENT DOCUMENTS 10,389,422 B2 * 8/2019 Muruganathan ..... H04B 7/0617
2015/0043458 A1 * 2/2015 Seo ....................... H04L 1/1861
370/329

(Continued)

OTHER PUBLICATIONS

International Search Report and Written Opinion—PCT/US2019/056550—ISA/EPO—dated Jan. 24, 2020.

(Continued)

*Primary Examiner* — Danh C Le

(57) ABSTRACT

Systems and methods for wireless communication include a user equipment (UE) and a base station, wherein the UE transmits additional channel state information (A-CSI), along with ACK/NACK (or "A/N") reporting to the base station in a soft A/N payload. The A/N reporting is responsive to downlink control information (DCI) grants in a downlink transmission from the base station. The A-CSI reporting is responsive one or more DCIs which include a CSI trigger. Even if one or more DCIs with CSI triggers are missed in the downlink transmission, the UE is designed to detect whether there may be any missing DCIs with CSI triggers and provide A-CSI reporting in the soft A/N payload based on this detection.

30 Claims, 10 Drawing Sheets

(56) References Cited

U.S. PATENT DOCUMENTS

| | | | | |
|---|---|---|---|---|
| 2015/0156764 | A1* | 6/2015 | Yang | H04L 5/001 |
| | | | | 370/329 |
| 2017/0331602 | A1* | 11/2017 | Hugl | H04L 5/0094 |
| 2017/0331670 | A1* | 11/2017 | Parkvall | H04W 52/028 |
| 2018/0270847 | A1* | 9/2018 | Takeda | H04L 1/0027 |
| 2019/0165846 | A1* | 5/2019 | Kim | H04B 7/0645 |
| 2019/0165847 | A1* | 5/2019 | Kim | H04B 7/0456 |
| 2019/0199422 | A1* | 6/2019 | Li | H04B 7/0617 |
| 2020/0119875 | A1* | 4/2020 | John Wilson | H04B 7/088 |

OTHER PUBLICATIONS

Qualcomm Incorporated: "Maintenance for CSI Reporting", 3GPP Draft, 3GPP TSG RAN WG1 Meeting #92bis, R1-1804786, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427053, pp. 1-15, Retrieved from the Internet: URL:http://www.3gpp.org/ftp/Meetings%5F3GPP%5FSYNC/RAN1/Docs/ [retrieved on Apr. 15, 2018] pp. 9.11, figure 4.

Qualcomm Inc:"Remaining Issues for Multiplexing UCI on PUSCH",3GPP TSG RAN WG1 Mtg #92bis, R1-1804804 Remaining Issues for Multiplexing UCI on PUSCH,3rd Generation Partnership Project (3GPP),Mobile Competence Centre,650,Route Des Lucioles,F-06921 Sophia-Antipolis Cedex,vol. RAN WG1, No. Sanya,CN, Apr. 16, 2018-Apr. 20, 2018, Apr. 15, 2018(Apr. 15, 2018),XP051427071,pp. 18,Retrieved from Internet: URL:http://www.3gpp.org/ftp/Meetings%5F3GPP%5FSYNC/RAN1/Docs/ [retrieved on Apr. 15, 2018],Sect 5-A-CSI reports per slot, p. 4, fig 4.

* cited by examiner

Semi-static codebook for A-CSI

Dynamic codebook for A-CSI

Separate DAI increments for DCIs with and w/o CSI

Joint encoding of A/N and A-CSI reports

SOFT ACK-NACK WITH CSI CODEBOOK

CROSS-REFERENCE TO RELATED APPLICATIONS

The present application for patent claims the benefit of U.S. Provisional Application No. 62/749,101 entitled "SOFT ACK-NACK WITH CSI CODEBOOK" filed Oct. 22, 2018, assigned to the assignee hereof, and expressly incorporated herein by reference in its entirety.

FIELD OF DISCLOSURE

Disclosed aspects are directed to reporting of channel state information (CSI) by a user equipment (UE) to a base station (BS). More specifically, exemplary aspects are directed to reporting of the CSI along with acknowledgment/negative-acknowledgment (ACK/NACK) information in the same payload in a predictable manner.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). The wireless communication systems may include a number of base stations or access network nodes, each simultaneously supporting communication for multiple communication devices, which may be otherwise known as user equipment (UE).

The wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA) and orthogonal frequency division multiple access (OFDMA) systems (e.g., a New Radio (NR) system), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, there is a need to significantly enhance the spectral efficiency of 5G mobile communications, compared to the current 4G standard. Furthermore, there is also a concomitant need to enhance signaling efficiencies and substantially reduce latency, compared to current standards.

SUMMARY

Systems and methods for wireless communication include a user equipment (UE) and a base station, wherein the UE transmits additional channel state information (A-CSI), along with ACK/NACK (or "A/N") reporting to the base station in a soft A/N payload. The A/N reporting is responsive to downlink control information (DCI) grants in a downlink transmission from the base station. The A-CSI reporting is responsive one or more DCIs which include a CSI trigger. Even if one or more DCIs with CSI triggers are missed in the downlink transmission, the UE is designed to detect whether there may be any missing DCIs with CSI triggers and provide A-CSI reporting in the soft A/N payload based on this detection.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
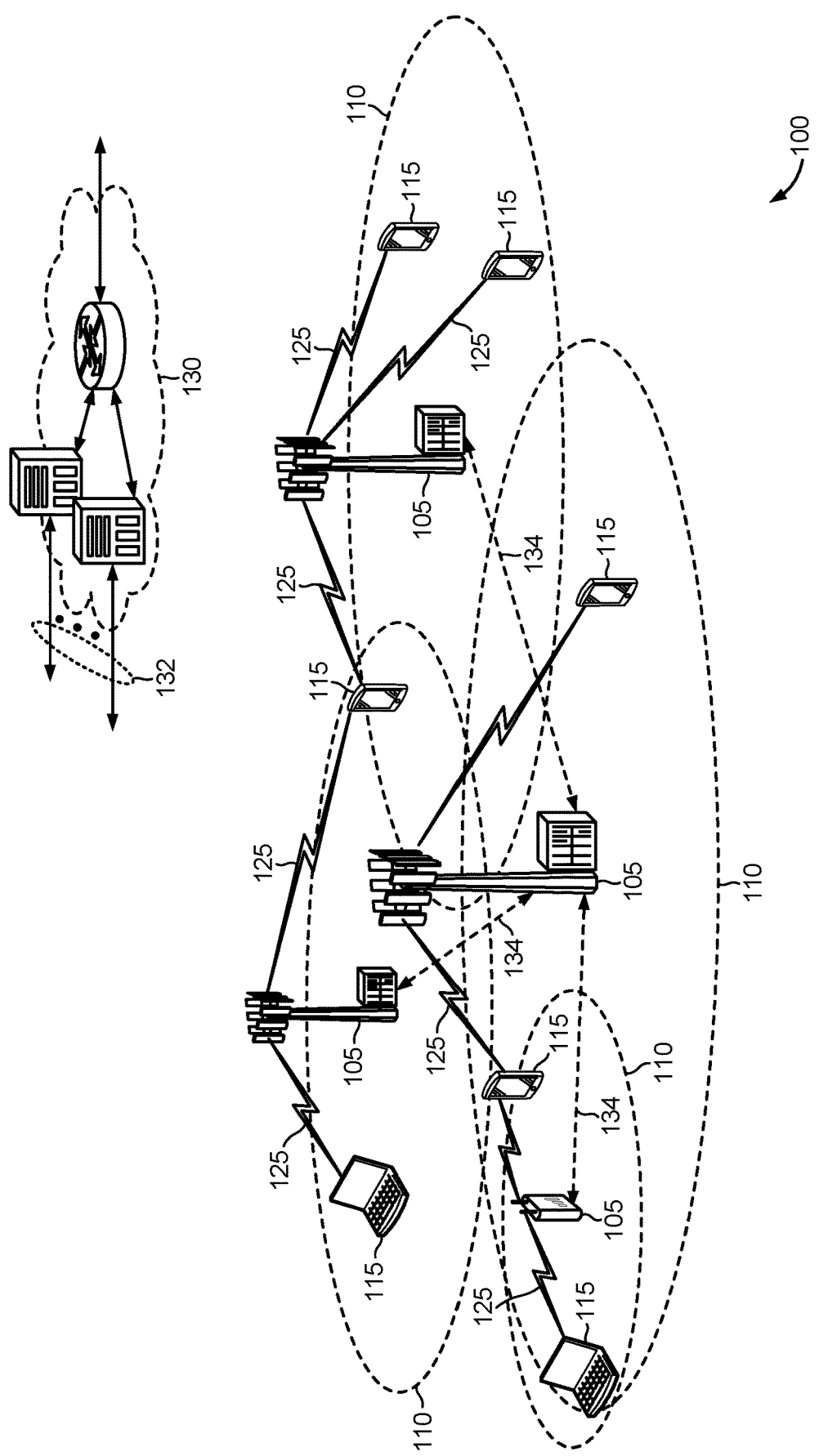
FIG. 1 illustrates an example wireless communication system according to aspects of this disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

The present disclosure relates to the transmission of channel state information (CSI), along with the ACK/NACK (or "A/N") reporting by the UE to a base station in a wireless communication system. The CSI reporting along with the A/N reporting is also referred to as a "soft A/N reporting" or "soft A/N payload" or "soft A/N codebook" herein, and it includes A/N information sent along with the CSI in a single payload which may be of flexible size depending on whether the CSI is present in the reporting. This type of CSI reporting (e.g., of a channel quality indicator or "CQI") by the UE may be responsive to a downlink grant or downlink control information (DCI) transmitted from the base station, with one or more DCIs in a downlink transmission including a CSI trigger. The A/N reporting is responsive to the DCIs themselves, with the additional CSI reporting included in response to the specific one or more DCIs which include the CSI trigger. This type of CSI reporting may be aperiodic and responsive to the specific DCIs, and is contrasted with periodic CSI reporting which may be sent by the UE without being responsive to DCIs with CSI triggers. As such, the aperiodic CSI reporting, alternatively referred to as additional CSI reporting, in A/N payloads is termed as "A-CSI" reporting or reporting of A-CSI bits in this disclosure.

It is possible that the UE may miss one or more DCIs in a downlink transmission. If the missed DCIs included CSI triggering, the UE may be unable to respond correctly with the A-CSI reporting in its A/N payload. Since the payload size of the soft A/N reporting varies based on whether or not the A-CSI bits are included, the payload size in the event of missed CSI triggering may be unexpected. The base station, unaware that the DCI with the CSI triggering was missed by the UE, may expect a payload size consistent with the A-CSI bits being included, but if there is a mismatch in the payload size from the expected payload size, the base station may be unable to decode the A/N payload transmitted by the UE. Aspects of this disclosure are directed to UE reporting techniques which are designed to overcome the above-mentioned problems.

By way of background, in some wireless communications networks, the base station may configure the user equipment (UE) in a carrier aggregation (CA) mode, in which two or more component carriers (CCs) may be configured for downlink transmissions, uplink transmissions, or any combination thereof. A communication link through which UEs can send signals to a base station is called an uplink channel (e.g., a reverse traffic channel, a reverse control channel, an access channel, etc.). A communication link through which the base station can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The base station may configure uplink resources for feedback transmissions in which the UE may indicate whether downlink transmissions were successfully or unsuccessfully received, such as hybrid automatic repeat request (HARQ) acknowledgment/negative-acknowledgment (ACK/NACK) information. In some cases, the one or more CCs may also be configured to provide feedback information with varying levels of granularity, such as providing feedback information at a less granular transport block (TB) level, or providing feedback information at a more granular code block group (CBG) level.

FIG. 1 illustrates an example of wireless communication system 100 in accordance with various aspects of the present disclosure. Wireless communication system 100 includes base stations 105, UEs 115, and core network 130. In some examples, wireless communication system 100 may be a Long Term Evolution (LTE), LTE-Advanced (LTE-A) network, or a New Radio (NR) network. In some aspects, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. Wireless communication system 100 may include base stations of different types (e.g., macro or small cell base stations). Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between or among different control regions in a cascaded manner (e.g., between a common control region and one or more UE-specific control regions).

UEs 115 may be dispersed throughout the wireless communication system 100, and each UE 115 may be stationary or mobile. As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices which can communicate with a core network via a radio access network (RAN). Through the core network, the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 702.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to core network 130. Core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected CCs using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as CA or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for CA. CA may be used with both FDD and TDD CCs.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

Figure 2:
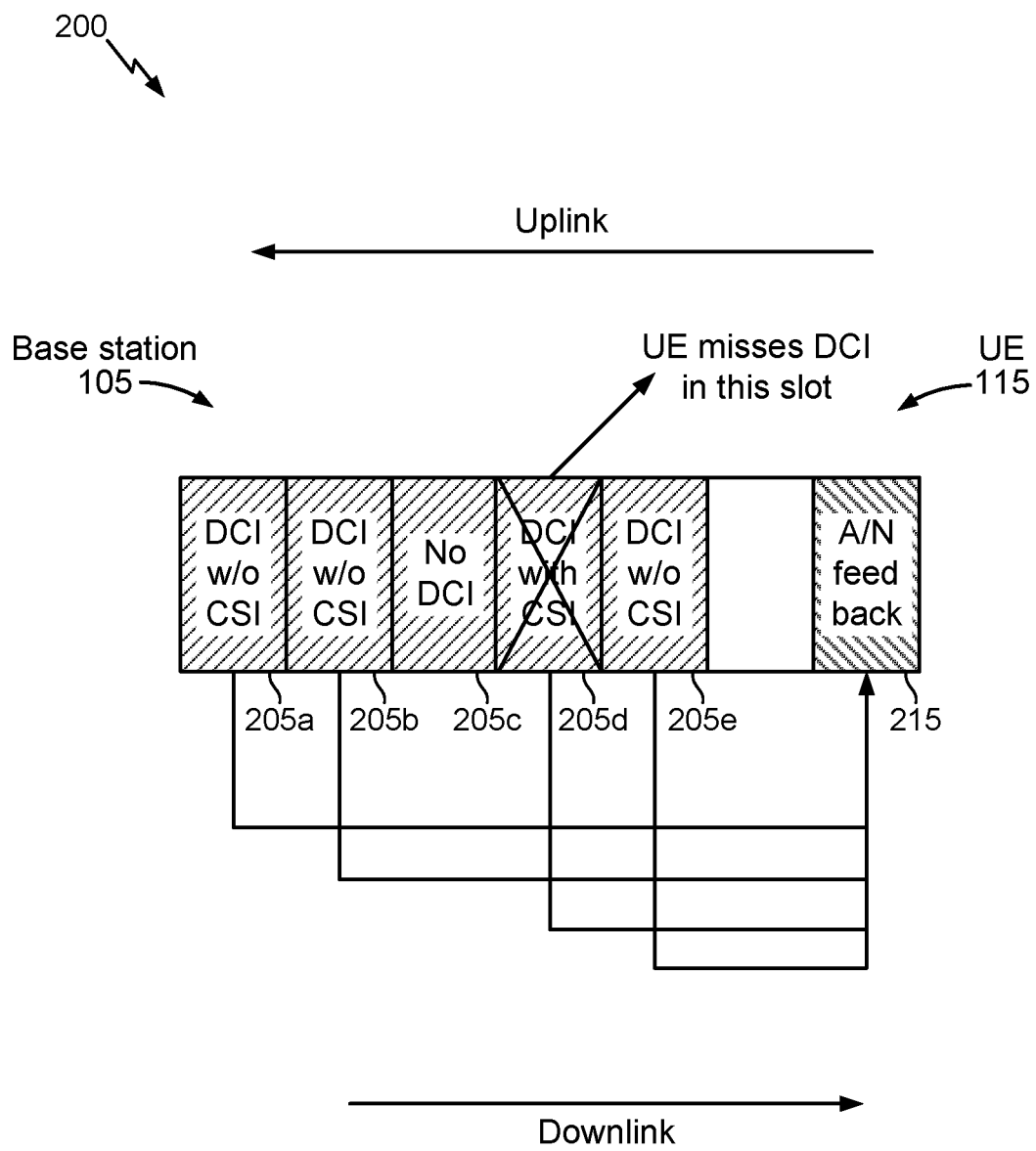
FIG. 2 illustrates an example of a wireless communication system with downlink grants and uplink soft A/N payloads according to aspects of this disclosure.

With reference to FIG. 2, an exemplary aspect of wireless communication system 100 is shown with base station 105 and UE 115 as described above with reference to FIG. 1. The downlink path 205 from base station 105 to UE 115 is illustrated with downlink transmissions 205a-e and an uplink path from UE 115 to base station 105 is shown with an uplink transmission 210. Although a single component carrier (CC) may be represented in the downlink path, aspects of this disclosure are also applicable to multi-carrier transmission, and will be described in detail in the following sections.

In FIG. 2, one or more downlink transmissions on slots 205a-e may include downlink grants or downlink control information (DCI), e.g., on a physical downlink shared channel (PDSCH). DCI generally includes information such as the resource blocks carry data, the type of demodulation scheme to be used, etc. UE 115, upon receiving the DCI, may first decode the DCI and based on the information obtained from decoding, is enabled to decode the data packets received on the downlink from base station 105. For each slot on which a DCI is received, UE 115 provides a corresponding ACK, and when a DCI is expected but not received, a corresponding NACK is supplied. Additionally, according to exemplary aspects, UE 115 may be directed to report additional channel state information (A-CSI) bits, e.g., based on available resources, in response to one or more of the DCIs in slots 205a-e which include CSI triggering.

The CSI may include information such as channel quality indicator (CQI) or variations thereof. In exemplary aspects, UE 115 may report the ACK/NACK (or simply "A/N") along with the A-CSI bits, e.g., on a physical uplink control channel (PUCCH). This type of A/N reporting with an optional inclusion of the A-CSI in a soft A/N payload may be of variable size as noted above. The reporting of the A-CSI bits may be aperiodic, and responsive to specific ones of the DCIs on downlink transmission slots 205a-e which include CSI triggers. The aperiodic CSI reporting in response to a DCI (with CSI triggering) is contrasted with traditional periodic CSI reporting, and may be used, for example to report minor or incremental updates in channel state or quality. In some examples, the CSI reporting may be in the form of CQI based on demodulation reference signals (DMRS).

As can be observed from FIG. 2, the DCIs on some downlink transmissions may include the CSI trigger, while some DCIs may be provided without the CSI trigger. For example, transmissions 205a-b and 205e are shown as DCIs without CSI triggers, transmission 205c is not a DCI, and transmission 205d is a DCI with CSI trigger. However, it is possible that UE 115 may miss the DCI with CSI trigger in transmission 205d. In this situation, without the exemplary implementations discussed below, the A/N payload provided by UE 115 on the uplink path would not include the A-CSI bits because UE 115 did not receive the CSI trigger due to missed transmission 205*d*. However, base station 205 would be expecting the A-CSI bits in the A/N payload from UE 115, and correspondingly, would detect a payload of unexpected size from UE 115 and be unable to decode the information received from UE 115 due to the payload size mismatch.

In the following description of the exemplary aspects of this disclosure, it is recognized that wireless communication protocols, e.g., according to the NR standards, the size of the A/N payload or codebook may be determined based on the codebook type of the DCI. In this regard, the A/N payload may be of two formats, namely, dynamic and semi-static.

The dynamic A/N payload is applicable when the downlink transmission slots include a downlink assignment index with each DCI sent on the PDSCH. So, for example, each of slots 205*a, b, d, e* which include a DCI in FIG. 2 would have an index value which is incremented in relation to the previous slot (e.g., slot 205*a* may have a DAI of 1, slot 205*b* may have a DAI of 2, slot 205*c* without a DCI would not increment the DAI, slot 205*d* would have a DAI of 3, and slot 205*e* would have a DAI of 4). UE 115, upon receiving the downlink transmissions, may obtain and store the DAIs.

Since the DAI values are incremented by one for each DCI in this example, the UE 115 may be able to determine if any of the DCIs were missed. So, in the above example, if the DCIs on slots 205*a*, 205*b*, and 205*e* were received but the DCI on slot 205*d* was not received by UE 115 as illustrated in FIG. 2, UE 115 would be able to determine that DCIs with DAIs of 1, 2, and 4 were received but a DCI of DAI 3 was not received and so would provide ACKs for the DCIs on slots 205*a, b, e* but a NACK for the missing DCI on slot 205*d*. In this manner, UE 115 may construct the A/N codebook or payload, also referred to as a dynamic A/N payload.

Although the above explanation of the dynamic A/N payload is directed to a single carrier example, the payload construction is similar when multiple carriers are involved in a multi-carrier example. Each of the two or more carriers may include separate DAI counts (e.g., a total count of the expected number of DCIs for that carrier and a running count of the DAIs within that carrier). In a multi-carrier implementation, the base station or gNB may also utilize joint DAIs across carriers. So, the gNB may increment the DAI value first across grants or DCIs from different carriers in the same time slot and then increment the DAIs across time slots as discussed above for the single carrier example. UE 115 may determine the A/N codebook based on these DAIs according to the specific implementation.

With respect to the semi-static payload, UE 115 may determine the PUCCH on which the A/N codebook is to be transmitted on the uplink, based on resource allocation parameters such as a K1 parameter (or other time domain allocation or A/N timing) which defines the time at which the A/N transmission is scheduled based on the number of slots of downlink transmission in the PDSCH. By decoding the DCIs, UE 115 may determine the number of slots expected in the downlink transmission, and based on comparing the number of slots actually received, may determine if any slots were missed. Correspondingly, UE 115 may construct its A/N codebook based on the number of slots received and the missed slots, if any.

In New Radio (NR), a transmission block from base station 105 may be of different granularities, as previously noted. A transport block (TB) is of a larger size, and includes multiple code blocks (CBs). A code block group (CBG) may be smaller than the TB and include multiple CBs, wherein for each CBG, A/N responses may be generated by UE 115. Whether the semi-static or dynamic codebook is used for the A/N payload, the CBG level A/N expectation may be indicated in the DCI, e.g., using the so called Format 0_1 and Format 1_1, which define the number of bits used for each A/N in the payload. If TB level reporting, a single bit may be sufficient for each A/N, whereas if CBG level reporting, of a finer granularity, is indicated, then two or more bits for each A/N may be reported. The reporting granularity to indicate whether CBG granularity is to be employed, may be enabled or disabled per carrier in a multi-carrier example. If CBG level reporting is enabled for a carrier, then an indication thereof is based on a field being present in each of the slots in the PDSCH using DCI Format 1_1, or the absence of the field using DCI Format 1_0.

Figure 3A:
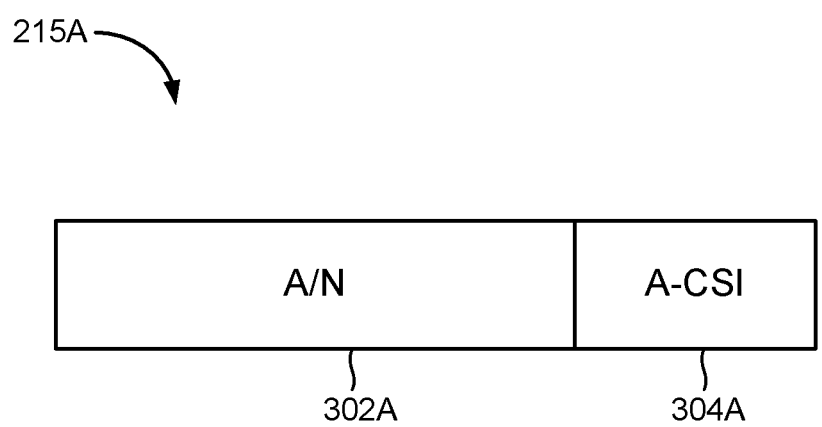
FIGS. 3A, E illustrate example soft A/N payloads according to aspects of this disclosure.

With reference to FIG. 3A, a first exemplary A/N codebook 215A (e.g., as applicable for a single carrier) is illustrated. A/N codebook 215A is referred to as a semi-static codebook which may include the A-CSI feedback. In A/N codebook 215A, for each A/N reporting instance, UE 115 adds a fixed number of extra bits, say a fixed number of N extra bits for A-CSI feedback or A-CSI reporting on the uplink. This brings the A/N payload size to a fixed payload size, which in turn is designed to avoid the payload size uncertainty problem discussed above. It is noted that A/N codebook 215A itself can be either semi-static or dynamic in nature, but it is only the size of the A-CSI reporting or A-CSI portion that is fixed. To explain, in FIG. 3A, A/N codebook 215A has two portions, A/N 302A, which may be constructed in a semi-static or a dynamic format as previously explained, and A-CSI 304A, which is constructed using a semi-static approach with a fixed size.

If there are multiple instances or DCIs on the downlink transmission which include CSI triggering, UE 115 may be configured to include the A-CSI bits for only the last triggered instance for which it can report A-CSI. Alternatively, A-CSI 304A may be sized to include multiple A-CSI reports and a subset of A-CSI reports (e.g., A-CSIs in response to a first few or last few DCIs with CSI triggers) may be used to populate A-CSI 304A.

If UE 115 did not receive any DCIs with the CSI triggers (e.g., as in the case of FIG. 2 with slot 205*d* being missed), then UE 115 may report a null A-CSI or repeat a last reported A-CSI or report a predetermined reference symbol (RS) or similar alternative in A-CSI 304A. While multiple DCIs with CSI triggers may be configured by base station 205 (or the gNB), in exemplary aspects, the payload size of A-CSI 304A may be chosen to accommodate the largest number of bits of A-CSI feedback which may possibly be needed for reporting, e.g., if all slots included CSI triggers.

Figure 3B:
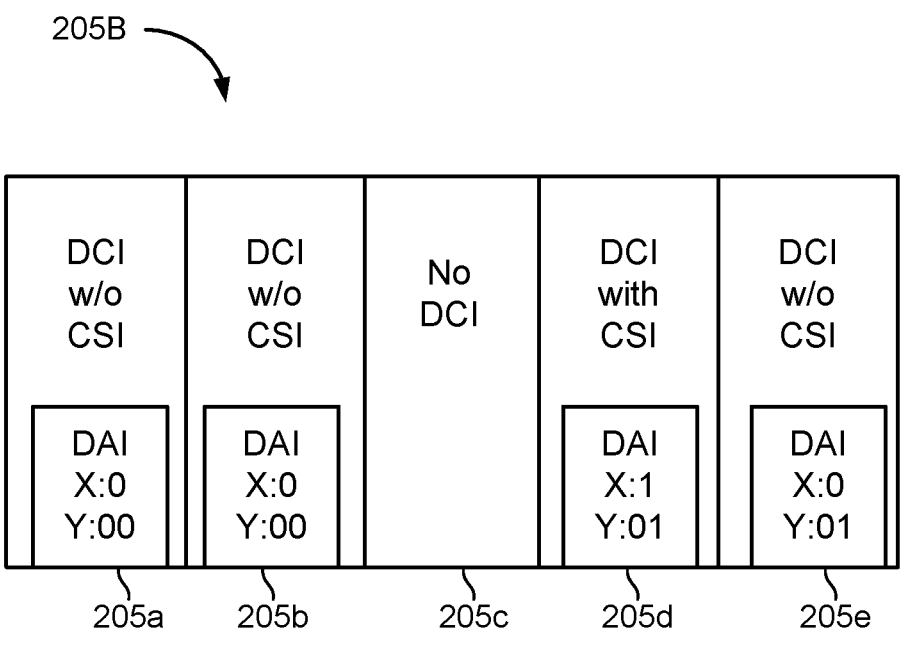
FIGS. 3B-D illustrate downlink transmissions according to aspects of this disclosure.

FIG. 3B illustrates downlink transmission 205B according to a second exemplary aspect pertaining to a dynamic codebook for A-CSI reporting by UE 115 (e.g., as applicable to a single carrier). Once again, the dynamic nature pertaining to the A-CSI is distinguished from the dynamic A/N reporting itself, which was discussed above. Thus, in addition to the previously mentioned DAIs which may be used for the purposes of A/N reporting, separate downlink assignment index (DAI) values are included in DCIs of slots 205*a-e* in downlink transmission 205B according to this aspect. These separate DAIs are included within each slot which has a DCI, to enable UE 115 to report if it missed any A-CSI trigger along with its A/N payload reporting.

As shown in FIG. 3B, each slot comprising a DCI carries additional bits of payload that indicate a CSI triggering state, which have been representatively shown as DAIs. These DAIs may be represented using different bits or states. Two options, X and Y are representatively illustrated as examples for the DAI state bits. In the first example, the DAIs in slots 205a, b, d, e may be 1-bit each, shown as X, wherein a value X being "0" indicates that no CSI has been triggered within that slot, while a value or state of "1" indicates that a CSI has been triggered within that slot (noting that slot 205c does not contain a DCI or a DAI state in this example). In the second example, wherein the DAIs are shown as Y, 2-bits may be used for representing the state, wherein a value of Y being "00" represents no A-CSI triggering, while a value of "01" indicates that one CSI has been triggered previously and so on (thus, both slot 205d and its subsequent slot 205e have been shown with Y as "01" even though the CSI trigger is only in slot 205d).

With the above format for downlink transmission 205B, UE 115 may be able to determine based on the state bits for the DAIs in the received slots whether a CSI trigger was missed. For example, if option X is used, and UE 115 recognizes that there is an increment in the DAI value for a CSI in a DCI, but UE 115 has not previously received a CSI trigger, then UE may realize that a CSI trigger was missed. For option Y, if UE 115 recognizes that there was a previous CSI triggering (e.g., from slot 205e having a DAI of "01") but UE 115 did not receive a CSI trigger (e.g., because UE 115 missed slot 205d), then UE 115 may recognize that a CSI trigger was missed. Upon recognition that a CSI trigger was included in transmission 205B based on any of the above implementations, even if the CSI trigger was missed, UE 115 may then include A-CSI reporting along with its A/N reporting, in a soft A/N codebook as previously discussed.

Figure 3C:
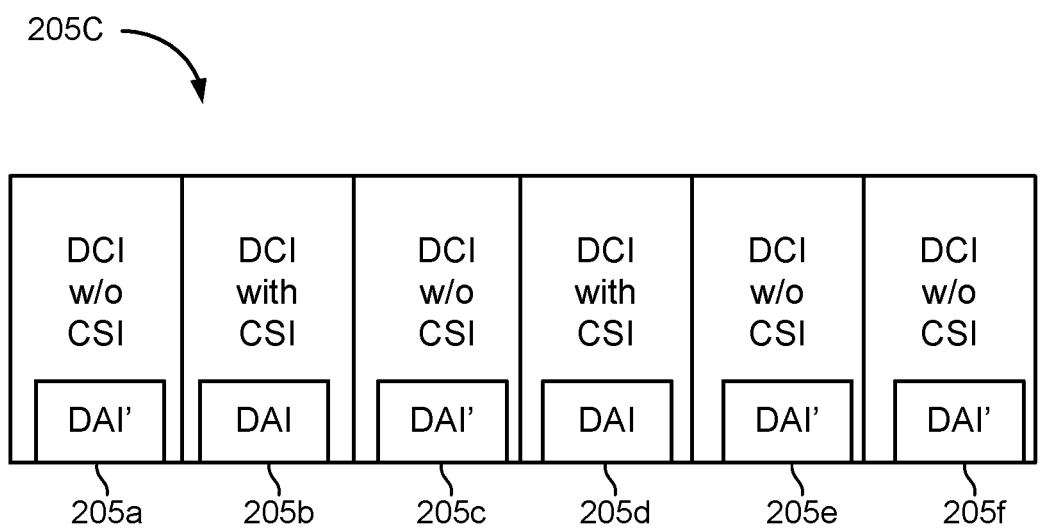

FIG. 3C illustrates downlink transmission 205C according to a third exemplary aspect pertaining to a soft A/N codebooks. In FIG. 3C, downlink transmission 205C is shown with slots 205a-f, wherein separate DAI increments are used for slots with DCIs including CSI triggering (a first set of DAI values) and slots with DCIs without CSI triggering (a second set of DAI values). As shown, slots 205a, c, e, f are shown to include DCIs without CSI triggering, for which a separate DAI' is indicated, while slots 205b, d which include DCIS with CSI triggering are shown with a DAI. DAI' is incremented separately from DAI. Thus, UE 115, upon receiving downlink transmission 205C may separately track the DAI for the DCIS which have CSI triggering, in order to determine whether a DCI with CSI triggering was missed. If a CSI triggering is determined to have been missed, UE 115 may including A-CSI reporting in its soft A/N codebook. It is noted that for a single carrier, the CSI is typically expected to be triggered only once within a reporting window, so this exemplary aspect may be more beneficial for multi-carrier applications.

Figure 3D:
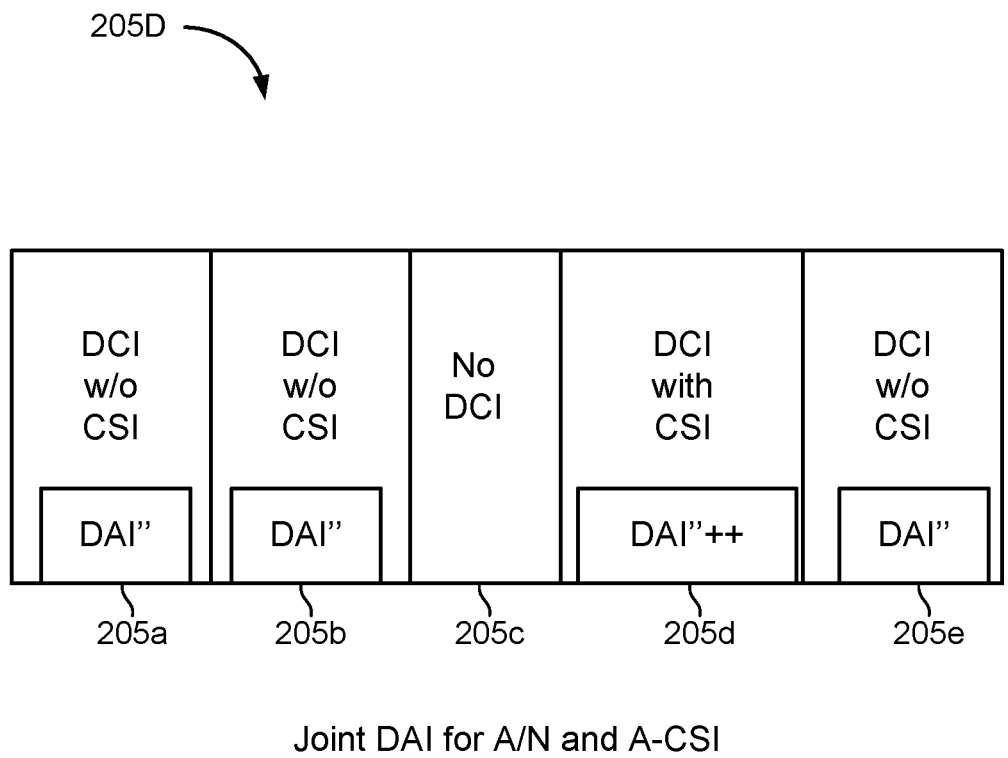

In FIG. 3D a fourth exemplary aspect is illustrated, wherein joint DAI values are used in downlink transmission 205D. As previously discussed, for a dynamic A/N codebook configuration, DAI values may already be in place for A/N reporting by UE 115 in response to DCIS. It is recognized that adding separate DAI bits for A-CSI reporting, as discussed in the above examples, may lead to an increase in the soft A/N payload. In order to minimize payload increase, in this example, the DAI for A/N reporting may be additionally incremented if CSI is also triggered in the DCI. In order to distinguish the DAI for A/N reporting from the DAI for A-CSI reporting which has been discussed above, in this example, the DAI for traditional A/N reporting is shown as DAI". With this notation, the additional DAI" increment when CSI is triggered is shown as DAI"++ for slot 205d which is the only DCI with CSI triggering in the example shown in FIG. 3D. If slot 205d is missed as mentioned in the previous examples, UE 115 may be able to detect this based on observing a DAI" with an increment of 2 in slot 205e, where only one DAI" increment would have been expected if there was no CSI triggering. It is recognized that UE 115 may also observe a similar DAI" increment of 2 if two DCIS without CSI triggering were missed, instead of one DCI with CSI triggering. However, the likelihood of two missing slots in the same downlink transmission is also recognized to be much lower than the likelihood of missing one slot, and therefore, this exemplary aspect has a high likelihood of correctly detecting a missed CSI trigger. Once UE 115 determines that a CSI trigger has been missed, UE 115 may include the A-CSI reporting in a soft A/N codebook as previously discussed.

Figure 3E:
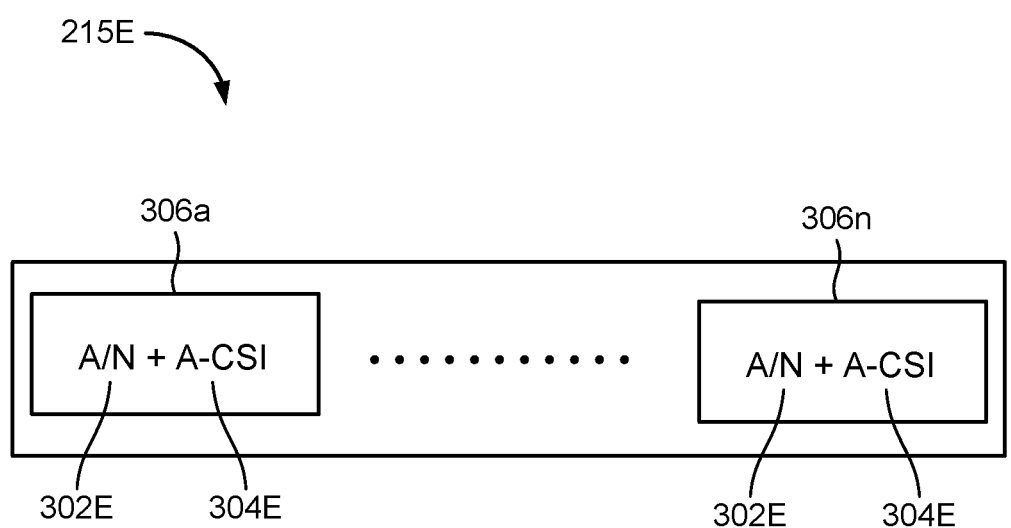

FIG. 3E illustrates a joint encoding of the soft A/N codebook 215E sent by UE 115, wherein the A/N and A-CSI reports are jointly encoded. FIG. 3E may be explained by contrasting the A/N codebook 215E with the A/N codebook 215A of FIG. 3A previously discussed. In FIG. 3A, the reporting of A/N 302A and A-CSI 304A were shown to be separate, to conceptually illustrate separate encodings for the two reports. For instance, if A-CSI reporting is triggered for multiple DCIs, A-CSI bits may be encoded with two or more bits to represent the A-CSIs for the different DCI triggers. This A-CSI reporting would be in addition to the encoding for A/N reporting, which may be one bit for each DCI. It is recognized that efficiencies may be gained by jointly encoding the A/N reporting and the A-CSI reporting.

It is possible to indicate A/N and A-CSI together using joint encoding, which is conceptually shown in FIG. 3E, wherein one or more jointly encoded blocks or states 306a-n, each with a multi-bit encoding of A/N 302E and A-CSI 304E may be provided within the same A/N codebook 215E. In each of the joint encoding states 306a-n, 2-bits, for example, may be provided to which may include an encoding of states such as [ACK], [NACK+A-CSI 1], [NACK+A-CSI 2], [NACK+A-CSI 3], etc., wherein A-CSI 1-3 may be A-CSI 304E reports for different CSI triggers received on a corresponding downlink transmission, while the combinations of ACK/NACK for A/N 302E for the DCIs in the downlink transmission.

In this aspect, additional information such as extra DAI bits may be provisioned by base station 105 in its downlink transmission, so that if UE 115 misses a DCI with CSI triggering, UE 115 may still determine the correct payload size in accordance with the previous example, and incorporate the joint encoding discussed herein. In the event that UE 115 detects a missed slot on the downlink transmission or PDCCH, the A/N codebook 215E may be pre-configured to include a respective NACK for the missed slot and include one of the A-CSIs, or alternatively, A/N codebook 215E may include a predetermined state to indicate the missed slot to inform base station 105 that the slot was missed; thus enabling base station 105 to avoid incorrect use of any A-CSI reported in A/N codebook 215E.

While the above exemplary aspects have been discussed with reference to single carriers, with applications to multi-carrier configurations in some cases, A-CSI reporting for multi-carrier downlink transmissions from a base station or gNB will now be considered in additional detail.

Figure 4:
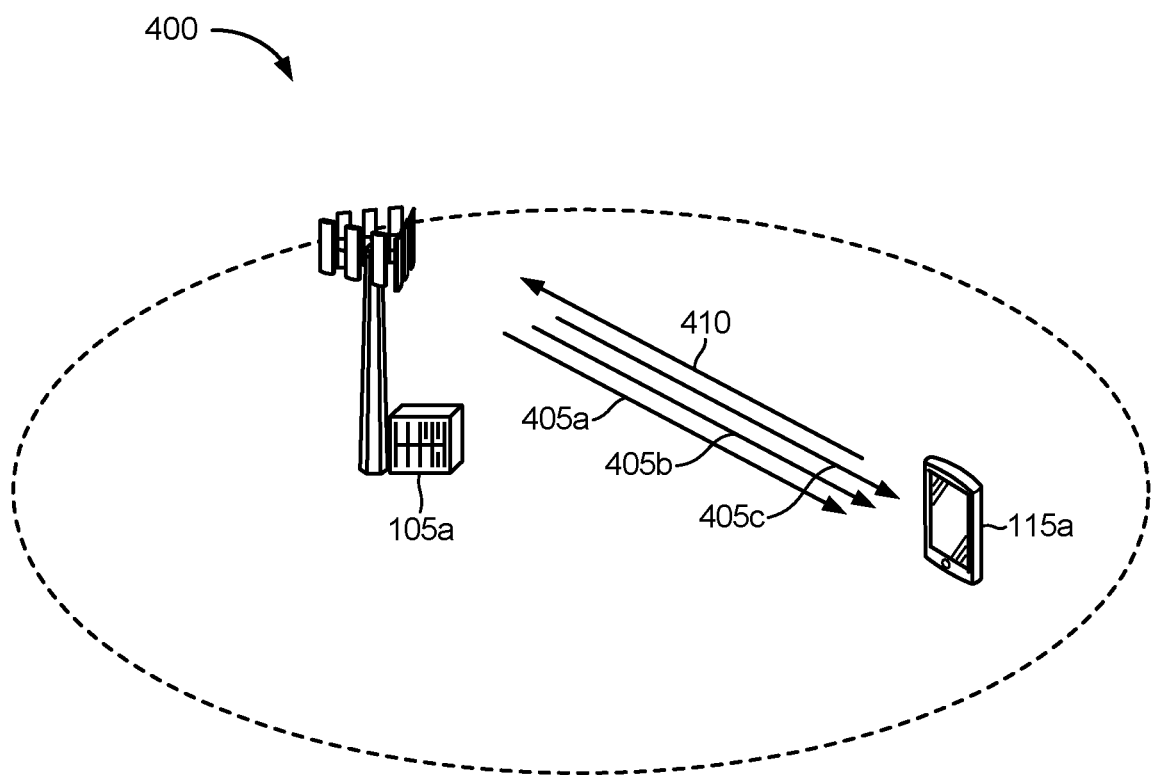
FIG. 4 illustrates an example of a multi-carrier wireless system according to aspects of this disclosure.

With reference to FIG. 4, wireless communication system 400 is shown, with base station 105a and UE 115a, which may be examples of aspects of base station 105 and UE 115 as described above with reference to FIG. 1. In the example of FIG. 4, wireless communication system 400 may support multi-carrier transmissions and operate according to a radio access technology (RAT) such as an LTE, a 5G or NR RAT, although techniques described herein may be applied to any RAT and to systems that may concurrently use two or more different RATs. Base station 105a may communicate with UE 115a over separate component carriers (CCs), such as downlink CCs 405a-c, etc., while UE 115a may communicate with base station 105a on uplink carrier 410. Each of the downlink CCs 405a-c may include separate slots or PDSCH transmissions, such as those discussed previously in the single carrier examples.

For multi-carrier systems as in FIG. 4, UE 115a may provide a soft A/N payload on uplink carrier 410 responsive to the multiple CCs 405a-c in a semi-static payload configuration by appropriately scaling up the number of bits for each carrier, as discussed with reference to FIG. 3A, for example.

With respect to a dynamic payload based on DAI for multi-carrier systems, it is possible that base station 105a may configure some of downlink CCs 405a-c with CBG based feedback and some carriers with TB based feedback, e.g., through radio resource control (RRC) signaling, and may configure a total number of bits for feedback of all of the downlink CCs 405a-c. For such dynamic payloads, the standards, such as 3GPP, NR, etc., specify that DAI is separately incremented for the slots or PDSCHs of downlink CCs 405a-c on which CBG based feedback is expected and on which TB based feedback is expected. An approach such as frequency first, time next order may be used in reporting A/N for the multiple carriers, e.g., by indicating A/N for the carrier or frequency along with the order of the DAIs for the respective carriers.

In order to accommodate feedback based on whether CSI is triggered or not in the DCIs of the multiple carriers, the following implementations are disclosed. In one aspect, four independent DAI increments may be provided, to indicate whether a DCI includes CSI triggering or not, and whether CBG feedback is expected or not. However, having the UE track four separate DAI increments may also be error prone, especially when some DCIs are missed.

In some aspects, separate DAI bits may be used to track CSI triggering. For example, in a multi-carrier system, if multiple CSI triggers are received, different reporting sizes for a soft/N payload reporting by the UE may be configured, keeping in mind that the base station may not correctly recognize the received payloads in situations wherein the UE misses multiple DCIs with CSI triggers.

In some aspects, UE may separate the traditional A/N reporting and the exemplary soft A/N with A-CSI reporting and transmit these separate reports on separate resources. For the soft A/N with A-CSI reporting, the base station may independently configure fixed payload based reporting or DAI based reporting as discussed previously. It is recognized, however, that additional power and resource consumptions may be involved in these aspects.

In some aspects, the reporting of the payload by the UE may be preconfigured, while in some aspects, the UE may be dynamically configured for individual reporting instances. If the reporting instance is preconfigured, the UE may drop an uplink transmission if the UE did not receive a CSI trigger, or alternatively, the UE may transmit a fixed payload in every instance. For dynamically determined reporting instances, the UE may not be aware of a transmission need if it does not receive the CSI trigger, and so may not include the A-CSI reporting in such cases.

Figure 5:
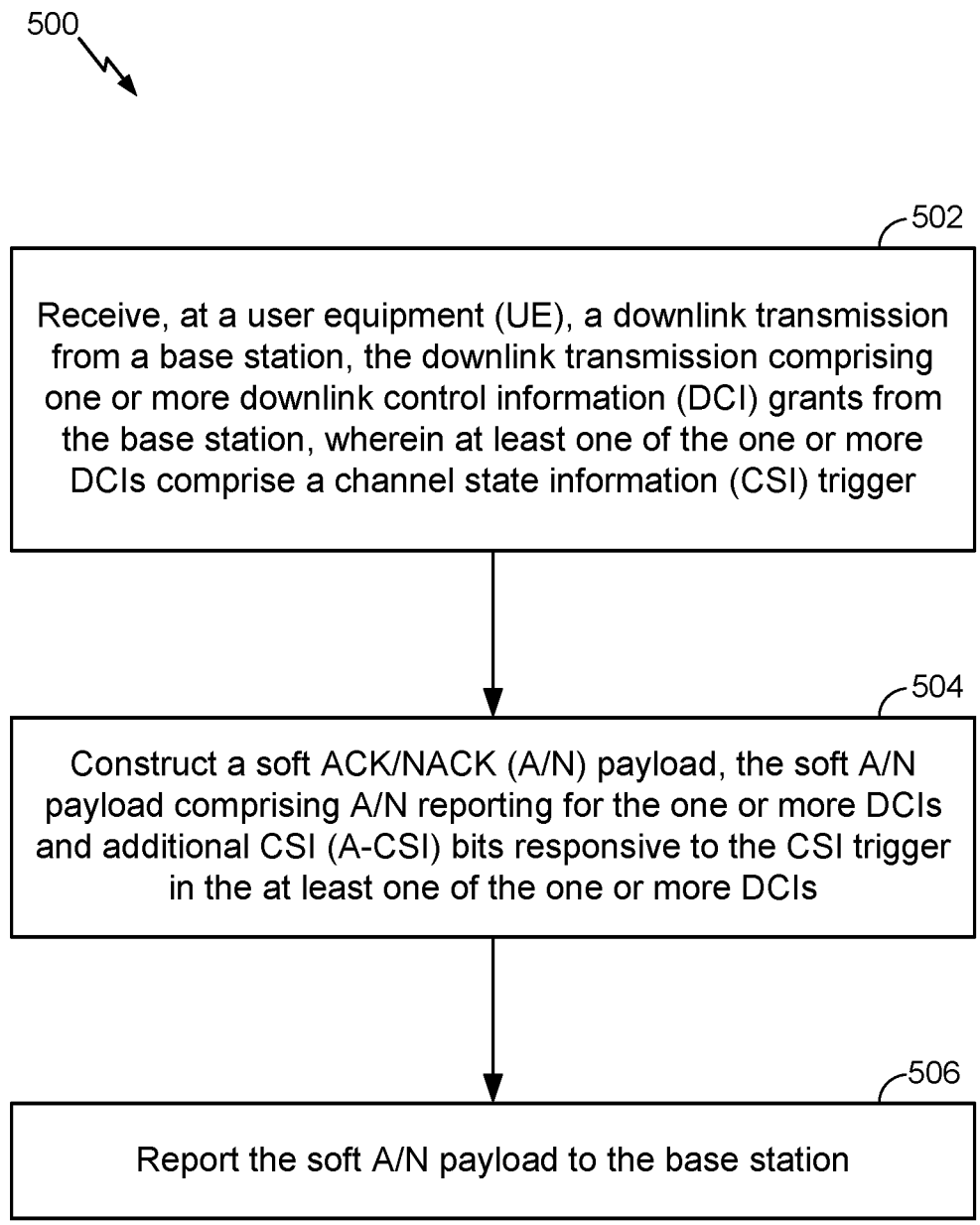
FIGS. 5-6 illustrate methods of wireless communication according to aspects of this disclosure.

It will be appreciated that exemplary aspects include various methods for performing the processes, functions and/or algorithms disclosed herein. For example, FIG. 5 illustrates a method 500 of wireless communication.

Block 502 comprises receiving, at a user equipment (e.g., UE 115), a downlink transmission (e.g., 205B-D of FIGS. 3B-D, respectively) from a base station (e.g., base station 105), the downlink transmission comprising one or more downlink control information (DCI) grants (e.g., in one or more slots 205a-e of FIG. 2) from the base station, wherein at least one of the one or more DCIs comprise a carrier state information (CSI) trigger (e.g., the DCI in slot 205d).

Block 504 comprises constructing a soft ACK/NACK (A/N) payload (e.g., 215A, E as shown in FIGS. 3A, E, respectively), the soft A/N payload comprising A/N reporting for the one or more DCIs and additional CSI (A-CSI) bits responsive to the CSI trigger in the at least one of the one or more DCIs.

Block 506 comprises reporting the soft A/N payload to the base station (e.g., reporting the soft A/N payload in the uplink direction shown in FIG. 2).

Figure 6:
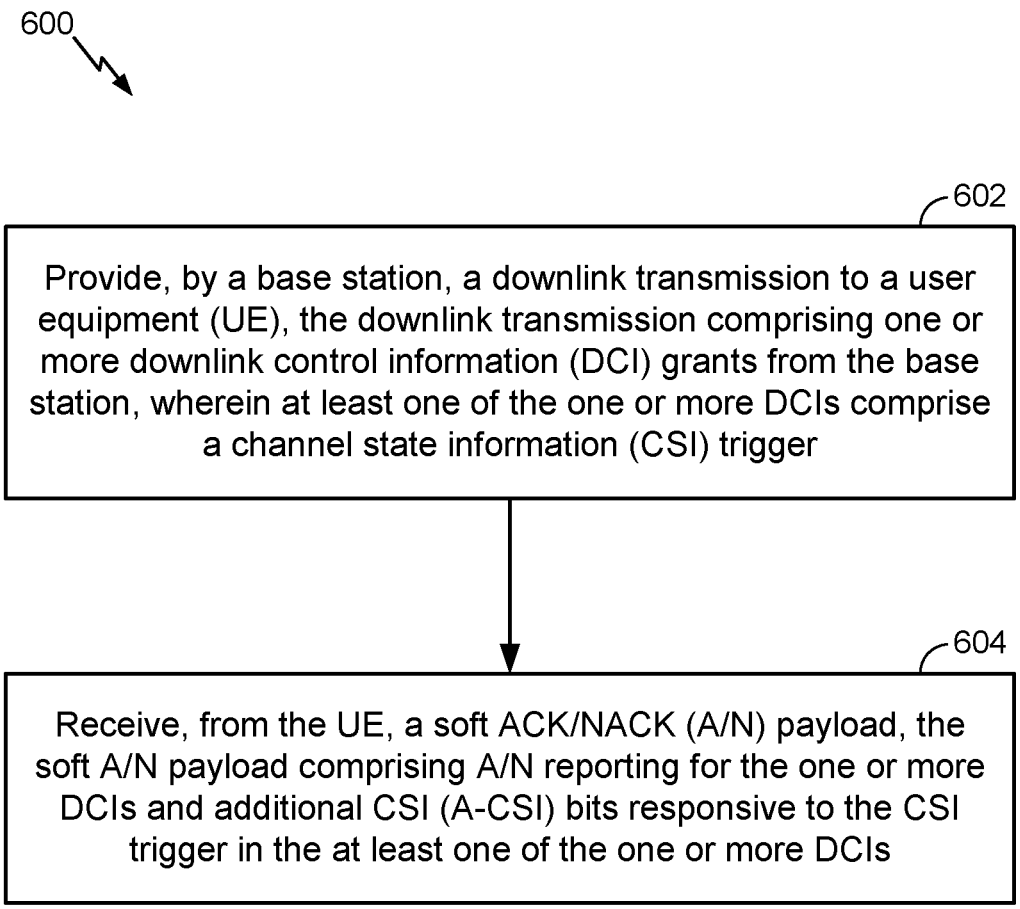

FIG. 6 illustrates another example method 600 of wireless communication.

Block 602 comprises providing, by a base station (e.g., base station 105), a downlink transmission (e.g., 205B-D of FIGS. 3B-D, respectively) to a user equipment (e.g., UE 115), the downlink transmission comprising one or more downlink control information (DCI) grants (e.g., in one or more slots 205a-e of FIG. 2) from the base station, wherein at least one of the one or more DCIs comprise a carrier state information (CSI) trigger (e.g., the DCI in slot 205d).

Block 604 comprises receiving, from the UE, a soft ACK/NACK (A/N) payload (e.g., 215A, E as shown in FIGS. 3A, E, respectively), the soft A/N payload comprising A/N reporting for the one or more DCIs and additional CSI (A-CSI) bits responsive to the CSI trigger in the at least one of the one or more DCIs.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method of reporting soft A/N payloads along with A-CSI bits by a UE. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of wireless communication, the method comprising:
    receiving, at a user equipment (UE), a downlink transmission from a base station, the downlink transmission comprising one or more downlink control information (DCIs) from the base station;
    constructing a soft ACK/NACK (A/N) payload, the soft A/N payload comprising A/N reporting for the one or more DCIs and additional channel state information (A-CSI) bits responsive to a CSI trigger in one or more DCIs;
    determining by the UE that at least one of the one or more DCIs comprising a CSI trigger was not received in the downlink transmission received by the UE, and
    constructing the soft A/N payload to include the A-CSI bits responsive to the at least one DCI comprising the CSI trigger; and
    reporting the soft A/N payload to the base station.

2. The method of claim 1, wherein constructing the soft A/N payload comprises forming a semi-static payload comprising a fixed number of bits assigned to the A-CSI bits.

3. The method of claim 1, wherein the downlink transmission includes downlink assignment index (DAI) values associated with each of the DCIs, wherein a DAI value for a DCI comprising a CSI trigger is different from a DAI value for a DCI without a CSI trigger, and wherein constructing the soft A/N payload comprises determining from the DAI values whether the at least one of the one or more DCIs comprises the CSI trigger.

4. The method of claim 1, wherein the downlink transmission includes a first set of downlink assignment index (DAI) values associated with DCIs comprising a CSI trigger and a second set of DAI values associated with DCIs without the CSI trigger, and wherein constructing the soft A/N payload comprises determining from the first set and the second set of DAI values whether the at least one of the one or more DCIs comprises the CSI trigger.

5. The method of claim 1, wherein the downlink transmission includes downlink assignment index (DAI) values associated with each of the DCIs, wherein a DAI value for a DCI comprising a CSI trigger is incremented twice and a DAI value for a DCI without a CSI trigger is incremented once, and wherein constructing the soft A/N payload comprises determining from the DAI values whether the at least one of the one or more DCIs comprises the CSI trigger.

6. The method of claim 1, wherein constructing the soft A/N payload comprises jointly encoding A/N and A-CSI reporting.

7. The method of claim 1, comprising downlink transmissions on multiple carriers from the base station, wherein constructing the soft A/N payload comprises forming a semi-static payload with a fixed number of bits assigned to the A-CSI bits of each of the multiple carriers.

8. The method of claim 1, comprising downlink transmissions on multiple carriers from the base station, wherein separate downlink assignment index (DAI) values are associated with each of the DCIs for indicating CSI triggers and indicating code block group (CBG) feedback.

9. A method of wireless communication, the method comprising:
    providing, by a base station, a downlink transmission to a user equipment (UE), the downlink transmission comprising one or more downlink control information (DCIs) from the base station, wherein at least one of the one or more DCIs comprise a channel state information (CSI) trigger; and
    receiving, from the UE, a soft ACK/NACK (A/N) payload, the soft A/N payload comprising A/N reporting for the one or more DCIs and additional CSI (A-CSI) bits responsive to the CSI trigger in the at least one of the one or more DCIs, wherein the soft A/N payload comprises A-CSI bits responsive to a missing DCI with the CSI trigger.

10. The method of claim 9, comprising associating downlink assignment index (DAI) values with each of the DCIs, wherein a DAI value for a DCI comprising a CSI trigger is different from a DAI value for a DCI without a CSI trigger, and wherein the received soft A/N payload comprises A-CSI bits based on the DAI values.

11. The method of claim 9, comprising associating a first set of downlink assignment index (DAI) values associated with DCIs comprising a CSI trigger and a second set of DAI values associated with DCIs without the CSI trigger, and the received the soft A/N payload comprises A-CSI bits based on the first set and the second set of DAI values.

12. The method of claim 9, comprising associating downlink assignment index (DAI) values with each of the DCIs, wherein a DAI value for a DCI comprising a CSI trigger is incremented twice and a DAI value for a DCI without a CSI trigger is incremented once, and wherein the received soft A/N payload comprises A-CSI bits based on the DAI values.

13. The method of claim 9, wherein the received soft A/N payload comprises jointly encoded A/N and A-CSI reporting.

14. The method of claim 9, comprising providing the downlink transmissions on multiple carriers to the UE, wherein the received soft A/N payload comprises a semi-static payload with a fixed number of A-CSI bits for each of the multiple carriers.

15. The method of claim 9, comprising providing the downlink transmissions on multiple carriers to the UE, wherein separate downlink assignment index (DAI) values are associated with each of the DCIs for indicating CSI triggers and indicating code block group (CBG) feedback.

16. An apparatus comprising:
    a user equipment (UE) configured for wireless communication with a base station, wherein the user equipment is configured to:
    receive a downlink transmission from the base station, the downlink transmission comprising one or more downlink control information (DCIs) from the base station;

construct a soft ACK/NACK (A/N) payload, the soft A/N payload comprising A/N reporting for the one or more DCIs and additional channel state information (A-CSI) bits responsive to a CSI trigger in one or more DCIs;

determine by the UE that at least one of the one or more DCIs comprising a CSI trigger was not received in the downlink transmission received, and construct the soft A/N payload to include the A-CSI bits responsive to the at least one DCI comprising the CSI trigger; and report the soft A/N payload to the base station.

17. The apparatus of claim 16, wherein the soft A/N payload comprises a semi-static payload with a fixed number of bits assigned to the A-CSI bits.

18. The apparatus of claim 16, wherein the downlink transmission includes downlink assignment index (DAI) values associated with each of the DCIs, wherein a DAI value for a DCI comprising a CSI trigger is different from a DAI value for a DCI without a CSI trigger, and wherein the UE is configured to construct the soft A/N payload with A-CSI bits based on the DAI values.

19. The apparatus of claim 16, wherein the downlink transmission includes a first set of downlink assignment index (DAI) values associated with DCIs comprising a CSI trigger and a second set of DAI values associated with DCIs without the CSI trigger, and wherein the UE is configured to construct the soft A/N payload with A-CSI bits based on the DAI values.

20. The apparatus of claim 16, wherein the downlink transmission includes downlink assignment index (DAI) values associated with each of the DCIs, wherein a DAI value for a DCI comprising a CSI trigger is incremented twice and a DAI value for a DCI without a CSI trigger is incremented once, and wherein the UE is configured to construct the soft A/N payload with A-CSI bits based on the DAI values.

21. The apparatus of claim 16, wherein the UE is configured to construct the soft A/N payload with a joint encoding of A/N and A-CSI reporting.

22. The apparatus of claim 16, wherein the UE is configured to receive downlink transmissions on multiple carriers from the base station, and construct the soft A/N payload as a semi-static payload with a fixed number of bits assigned to the A-CSI bits of each of the multiple carriers.

23. The apparatus of claim 16, wherein the UE is configured to receive downlink transmissions on multiple carriers from the base station, wherein separate downlink assignment index (DAI) values are associated with each of the DCIs for indicating CSI triggers and indicating code block group (CBG) feedback, and wherein the UE is configured to construct the soft A/N payload with A-CSI bits based on the separate DAI values.

24. An apparatus comprising:
a base station configured for wireless communication with a user equipment (UE), wherein the base station is configured to:

transmit a downlink transmission to the UE, the downlink transmission comprising one or more downlink control information (DCIs) from the base station; and receive, from the UE, a soft ACK/NACK (A/N) payload, the soft A/N payload comprising A/N reporting for the one or more DCIs and additional channel state information (A-CSI) bits responsive to a CSI trigger in the at least one of the one or more DCIs, wherein the soft A/N payload comprises A-CSI bits responsive to a DCI not received with the CSI trigger.

25. The apparatus of claim 24, wherein the base station is configured to associate downlink assignment index (DAI) values with each of the DCIs, wherein a DAI value for a DCI comprising a CSI trigger is different from a DAI value for a DCI without a CSI trigger, and wherein the received soft A/N payload comprises A-CSI bits based on the DAI values.

26. The apparatus of claim 24, wherein the base station is configured to associate a first set of downlink assignment index (DAI) values associated with DCIs comprising a CSI trigger and a second set of DAI values associated with DCIs without the CSI trigger, and the received the soft A/N payload comprises A-CSI bits based on the first set and the second set of DAI values.

27. The apparatus of claim 24, wherein the base station is configured to associate downlink assignment index (DAI) values with each of the DCIs, wherein a DAI value for a DCI comprising a CSI trigger is incremented twice and a DAI value for a DCI without a CSI trigger is incremented once, and wherein the received soft A/N payload comprises A-CSI bits based on the DAI values.

28. The apparatus of claim 24, wherein the received soft A/N payload comprises jointly encoded A/N and A-CSI reporting.

29. The apparatus of claim 24, wherein the base station is configured to provide the downlink transmissions on multiple carriers to the UE, wherein the received soft A/N payload comprises a semi-static payload with a fixed number of A-CSI bits for each of the multiple carriers.

30. The apparatus of claim 24, wherein the base station is configured to provide the downlink transmissions on multiple carriers to the UE, wherein separate downlink assignment index (DAI) values are associated with each of the DCIs for indicating CSI triggers and indicating code block group (CBG) feedback.

\* \* \* \* \*